US011419164B2

(12) United States Patent
Shyamalan

(10) Patent No.: US 11,419,164 B2
(45) Date of Patent: Aug. 16, 2022

(54) PAIRING METHOD FOR MONITORING DEVICES

(71) Applicant: Verizon Patent and Licensing Inc., Arlington, VA (US)

(72) Inventor: Shyam T. Shyamalan, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 467 days.

(21) Appl. No.: 15/705,040

(22) Filed: Sep. 14, 2017

(65) Prior Publication Data
US 2019/0082476 A1 Mar. 14, 2019

(51) Int. Cl.
| | |
|---|---|
| *H04W 76/11* | (2018.01) |
| *G08B 25/10* | (2006.01) |
| *H04W 4/02* | (2018.01) |
| *H04W 4/50* | (2018.01) |
| *H04W 4/80* | (2018.01) |
| *H04W 8/18* | (2009.01) |
| *H04W 8/26* | (2009.01) |
| *H04W 4/029* | (2018.01) |

(52) U.S. Cl.
CPC ............. *H04W 76/11* (2018.02); *G08B 25/10* (2013.01); *H04W 4/02* (2013.01); *H04W 4/029* (2018.02); *H04W 4/50* (2018.02); *H04W 4/80* (2018.02)

(58) Field of Classification Search
CPC ......... H04W 4/80; H04W 4/02; H04W 76/11; H04W 4/029; H04W 4/50; H04W 8/18; G08B 25/10
See application file for complete search history.

(56) References Cited

U.S. PATENT DOCUMENTS

| | | | | |
|---|---|---|---|---|
| 9,297,882 | B1 * | 3/2016 | Bhatia | H04W 4/21 |
| 9,843,898 | B1 * | 12/2017 | Greenberger | H04W 4/023 |
| 10,097,641 | B2 * | 10/2018 | Maguire | H04W 4/21 |
| 2013/0067086 | A1 * | 3/2013 | Hershko | H04L 61/157 709/225 |
| 2015/0245186 | A1 * | 8/2015 | Park | H04W 4/80 455/417 |
| 2016/0066122 | A1 * | 3/2016 | Kao | H04W 4/70 455/418 |
| 2016/0164883 | A1 * | 6/2016 | Li | H04W 12/0023 726/7 |
| 2017/0201850 | A1 * | 7/2017 | Raleigh | H04W 4/50 |
| 2018/0009416 | A1 * | 1/2018 | Maiwand | G07C 9/00309 |
| 2018/0098230 | A1 * | 4/2018 | Obaidi | H04W 24/02 |
| 2018/0368101 | A1 * | 12/2018 | Agiwal | H04W 68/00 |

* cited by examiner

*Primary Examiner* — Asghar H Bilgrami

(57) ABSTRACT

A device may obtain a device identifier from a monitoring device. The device may provide, to a server device, a request for a network-assigned identifier that is associated with the monitoring device. The request may cause the server device to use the device identifier to search a data structure for the network-assigned identifier. The device may receive the network-assigned identifier from the server device. The device may provide a request to establish a communication session with the monitoring device. The request may include the network-assigned identifier of the monitoring device and a network-assigned identifier of the device. The device may receive, after providing the request, an indication that the communication session is established.

20 Claims, 6 Drawing Sheets

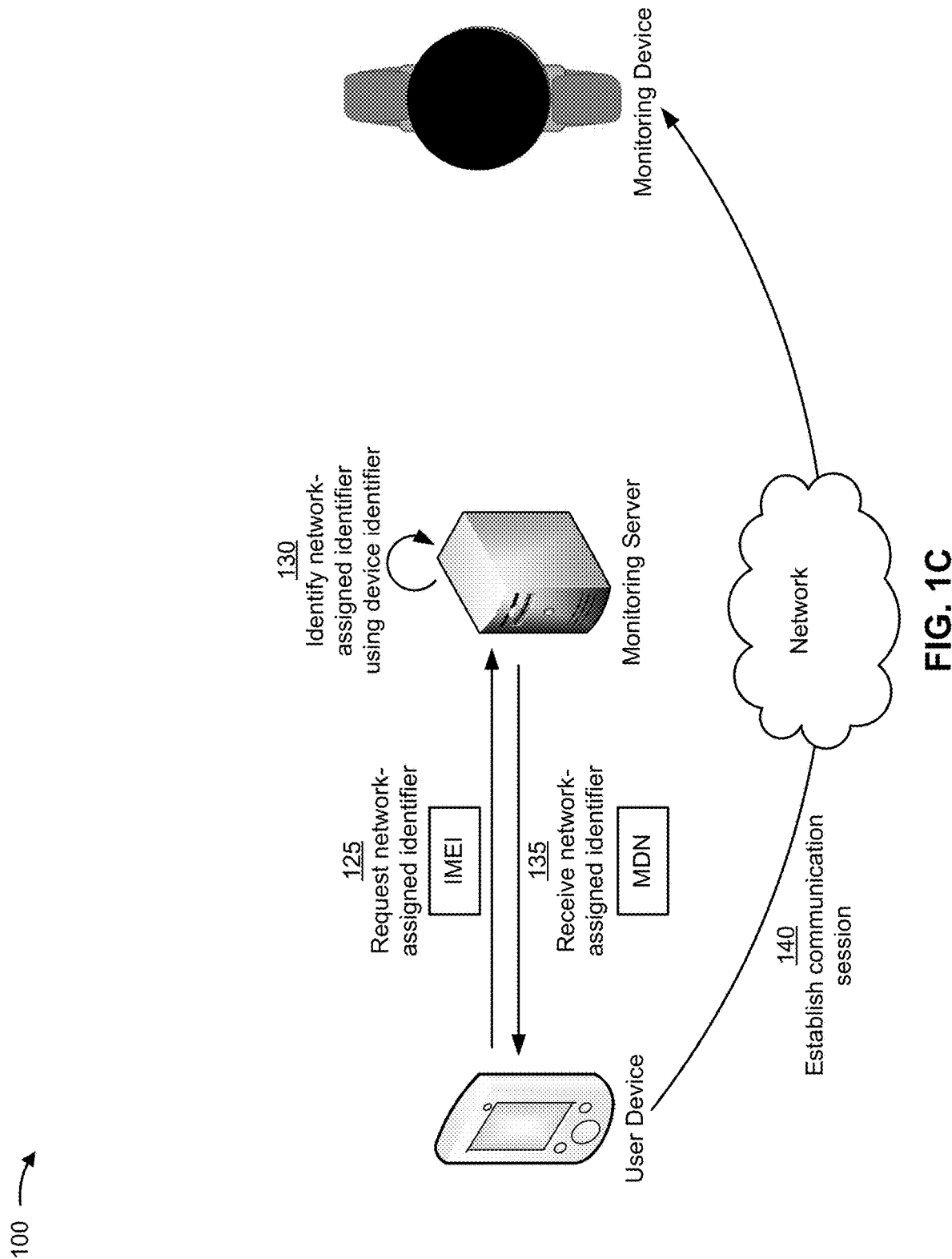

PAIRING METHOD FOR MONITORING DEVICES

BACKGROUND

A monitoring device, such as a tracking device, may allow a user to track a location of the tracking device or a person associated with the tracking device. For example, a parent may track a location of a child by attaching a tracking device to the child or to an object associated with the child (e.g., a backpack).

BRIEF DESCRIPTION OF THE DRAWINGS

FIGS. 1A-1C are diagrams of an overview of an example implementation described herein;

DETAILED DESCRIPTION OF PREFERRED EMBODIMENTS

Figure 1A:
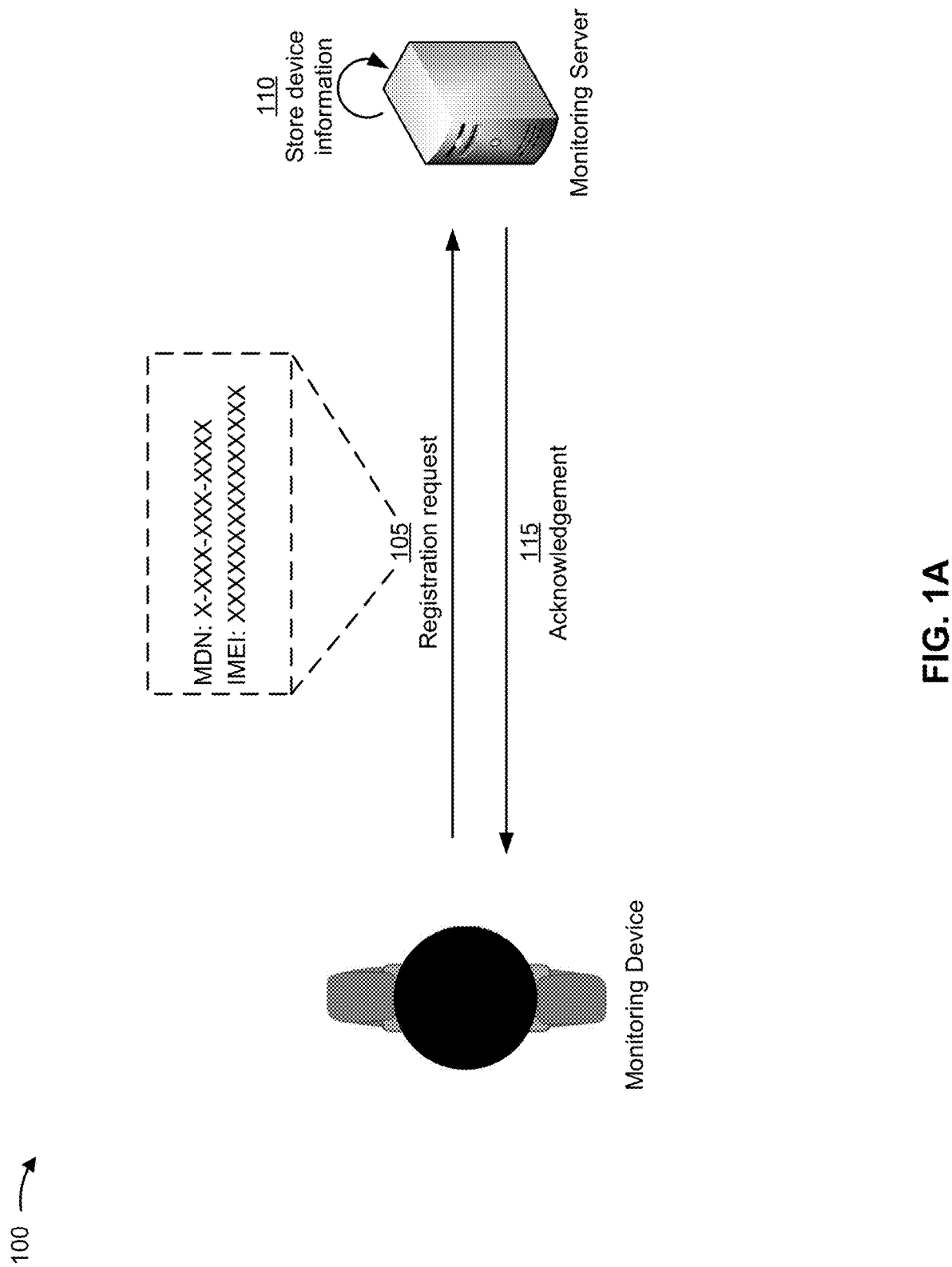

The following detailed description of example implementations refers to the accompanying drawings. The same reference numbers in different drawings may identify the same or similar elements.

A monitoring device may allow a user to monitor a location or a status of the monitoring device or a person associated with the monitoring device. For example, a child may wear a monitoring device (e.g., a smart watch) that may allow the parent to communicate with the child and/or to monitor (e.g., track) a geographic location of the child. In this case, the parent may track the child by pairing a user device (e.g., a mobile phone) with the monitoring device using a mobile directory number (MDN) of the monitoring device.

To enable the pairing, the monitoring device may have a display screen that allows the MDN to be displayed and captured by the user device, or may have a speaker or some other means of communicating information, (e.g., lights, beeps, etc.) to allow the MDN to be provided to the user device via a voice communication. However, some monitoring devices do not include a display screen or a speaker. In this case, the user device may not be able to obtain an MDN of the monitoring device, which may prevent the user device from pairing with the monitoring device.

Some implementations described herein provide a method for a user device to pair with a monitoring device, such as a monitoring device that does not include a display or a speaker. In an embodiment, a monitoring server stores a device identifier (e.g., an international mobile equipment identity (IMEI)) and a network-assigned identifier (e.g., an MDN) for a monitoring device. The user device may obtain the device identifier from the monitoring device (e.g., by scanning a barcode, via a communication over a wireless personal area network (WPAN), etc.) and then may use the device identifier to obtain the network-assigned identifier of the monitoring device from the monitoring server.

In this way, the user device is able to obtain and use the network-assigned identifier to establish a communication session with the monitoring device, without requiring the monitoring device to have a method, such as a display screen or a speaker, for conveying the network-assigned identifier. By pairing the monitoring device and the user device using the method described herein, the method allows for simplified monitoring devices that do not need to be able to display or otherwise convey the network-assigned identifier. Furthermore, a network-assigned identifier does not need to be pre allocated and assigned to a monitoring device prior to operation and network providers do not need to allocate network-assigned identifiers that may never be utilized, thereby minimizing memory usage and storage capacity. Further, the described methods conserve processing resources of the monitoring device that might otherwise be used to display the network-assigned identifier on a display screen or that might otherwise be used to provide the network-assigned identifier via a voice communication and a speaker.

Figure 1B:
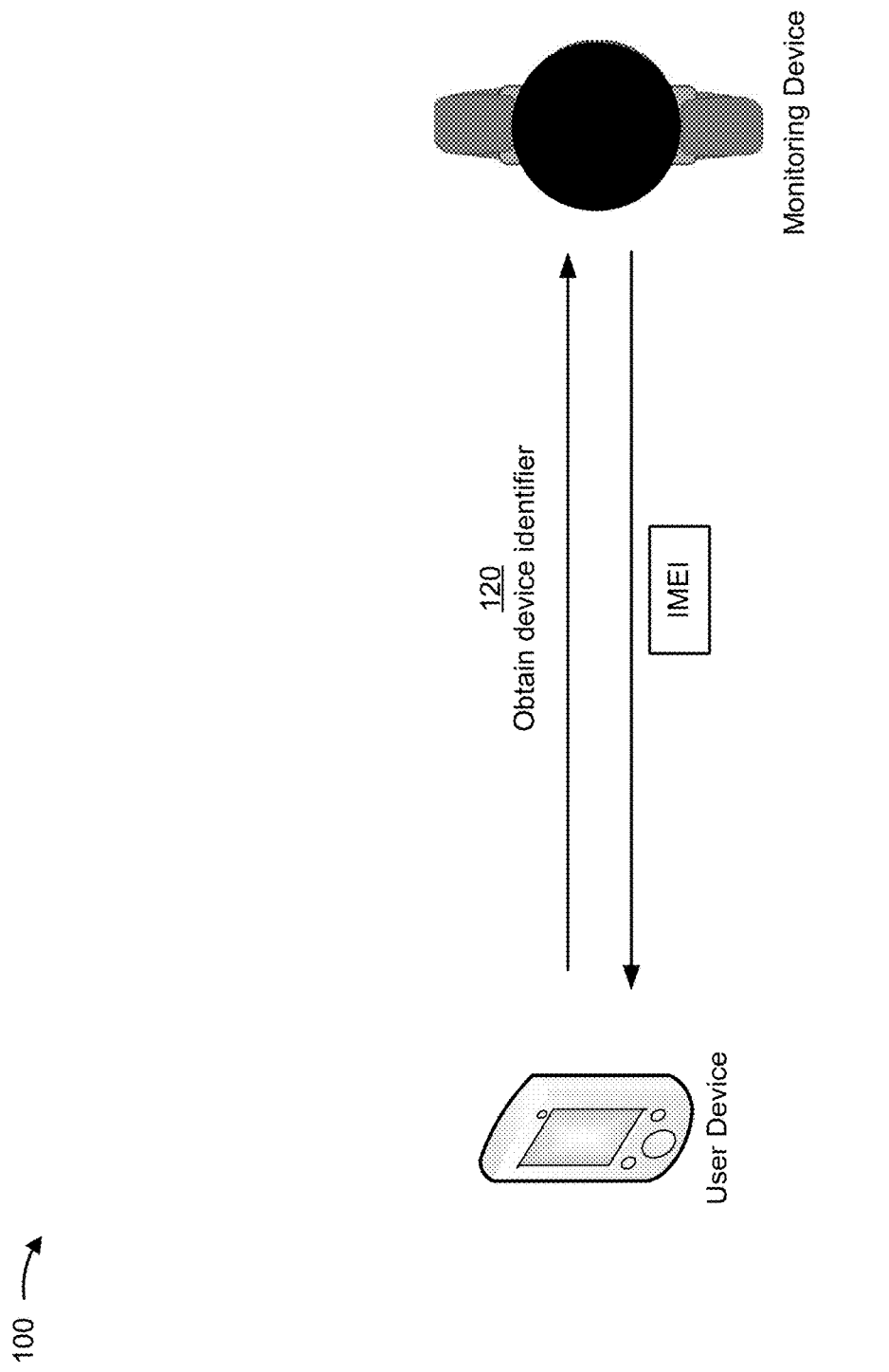

FIGS. 1A-1C are diagrams of an overview of an example implementation 100 described herein. As shown in FIGS. 1A-1C, example implementation 100 may include a monitoring device, a monitoring server, and a user device.

In some implementations, the monitoring device may be a device affixed to a user (e.g., a device affixed to a wristband, a device affixed to a lanyard, a device affixed to a backpack, etc.), a device affixed to a vehicle (e.g., a truck, a boat, a plane, etc.), or the like, and may be capable of sending and/or receiving location information. In some implementations, the monitoring device may not include a speaker or a display screen. In some implementations, the user device (e.g., a mobile phone) may support a monitoring application that allows the user device to monitor and display the location and/or status of the monitoring device.

As shown in FIG. 1A, and by reference number 105, the monitoring device may provide a registration request to the monitoring server. The request may include device information (e.g., a device identifier (IMEI), a network-assigned identifier (MDN), etc.). In this case, the monitoring device may have access to a uniform resource locator (URL) associated with the monitoring server, and may use the URL to provide the registration request.

Additionally, prior to providing the registration request, the monitoring device may be provisioned with the network-assigned identifier. For example, the monitoring device may be provisioned with the network-assigned identifier by a network service provider when the monitoring device is activated. As an example, a user may purchase the monitoring device (e.g., from a retail store), and the monitoring device may be activated upon purchase. In this case, the monitoring device may obtain (e.g., download) the network-assigned identifier during the activation process. Furthermore, the monitoring device may already have the device identifier, which may have been assigned prior to device activation (e.g., the device identifier may be assigned during the manufacturing process).

As shown by reference number 110, the monitoring server may store the device information. For example, the monitoring server may store the device information using a data structure, such as with a flat file, a database (e.g., a relational database), a tree, a hash table, a graph, or the like. In this case, the device information may be stored such that the device identifier and the network-assigned identifier are associated with each other. As shown by reference number 115, the monitoring server may provide, to the monitoring device, an acknowledgement that the monitoring device has been registered.

In this way, the device information (e.g., the IMEI and MDN) may be sent to and stored by the monitoring server.

As shown in FIG. 1B, and by reference number 120, the user device may obtain the device identifier from the monitoring device. For example, the user device may obtain the device identifier using a scanning technique. As an example, the user device may scan a code (e.g., a barcode or a QR code) associated with the monitoring device to obtain the device identifier. In some cases, the tracking application may perform the scanning technique. In other cases, a different application and/or physical device component (e.g., a scanner) associated with the user device may perform the scanning technique.

In some implementations, the user device may obtain the device identifier using another method. For example, the user device may obtain the device identifier via a communication over a WPAN. As another example, the user device may obtain the device identifier by user input. In this case, the device identifier may be written on the monitoring device or on the packaging, may be provided by the manufacturer, the retailer or any other third party, and a user may input the device identifier to a user interface of the user device.

In this way, the user device is able to obtain the device identifier, which may be used to identify the network-assigned identifier, as described herein. In an alternative embodiment, the device identifier may be obtained via a near field communication between the user device and the monitoring device.

As shown in FIG. 1C, and by reference number 125, the user device may provide a request for the network-assigned identifier to the monitoring server. For example, the user device may provide a request that includes the device identifier (e.g., the IMEI). As shown by reference number 130, the monitoring server may use the device identifier to search the data structure to identify the network-assigned identifier (e.g., the MDN). As shown by reference number 135, the user device may receive the network-assigned identifier from the monitoring server.

As shown by reference number 140, the user device may establish a communication session with the monitoring device. For example, the user device may provide a request to establish a communication session to the monitoring device (e.g., via a network). The request may include the network-assigned identifier for the monitoring device and a network-assigned identifier for the user device. In this case, a network device may provide (e.g., via a short message service (SMS) message) the request to the monitoring device. In some cases, a user may push a button on the monitoring device to accept and establish the communication session. In other cases, the communication session may be established automatically.

In this way, the user device is able to obtain and use the network-assigned identifier to establish a communication session with the monitoring device, without requiring the monitoring device to have a display screen or a speaker.

As indicated above, FIGS. 1A-1C are provided merely as an example. Other examples are possible and may differ from what was described with regard to FIG. 1. For example, the monitoring device may be any device capable of pairing with the user device, such as a device that monitors temperature, water levels, humidity levels, CO2 levels, and/or the like. Additionally, or alternatively, example implementation 100 may be carried out on a monitoring device with a display screen and/or with a speaker to cater to a user that has impaired hearing or impaired vision.

Furthermore, there may be additional devices, fewer devices, different devices, or differently arranged devices than those shown in FIGS. 1A-1C. Additionally, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of environment 100 may perform one or more functions described as being performed by another set of devices of environment 100.

Figure 2:
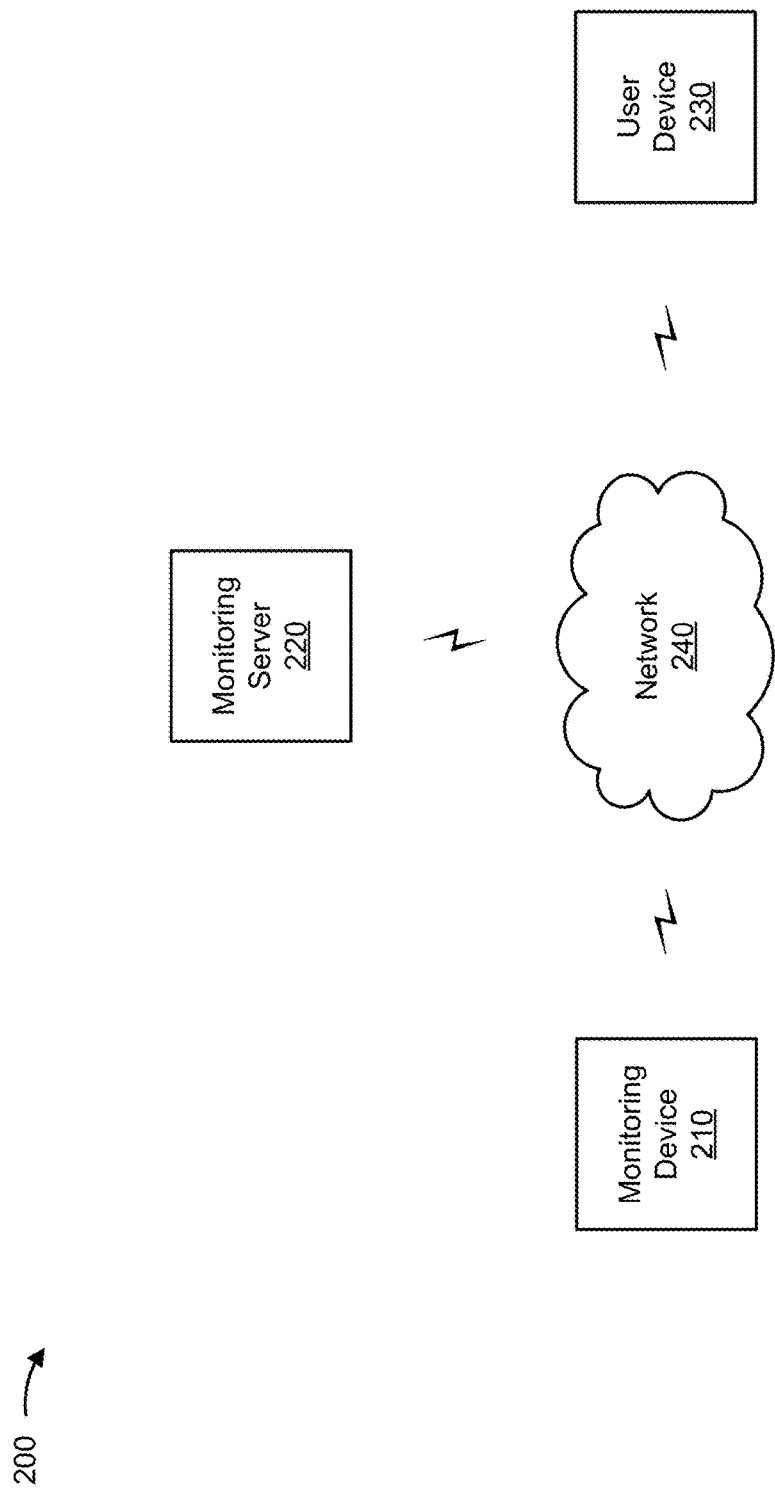
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a monitoring device 210, a monitoring server 220, a user device 230, and/or a network 240. Devices of environment 200 may interconnect via wired connections, wireless connections, optical connections, or a combination of connections.

Monitoring device 210 includes one or more devices capable of receiving, storing, processing, and/or providing information associated with device tracking. For example, monitoring device 210 may include a tracking device, a device capable of monitoring temperature, water level, humidity, or the like, a phone (e.g., a mobile phone), a tablet computer, a handheld device, a portable device, a wearable communication device (e.g., a smart wristwatch, a pair of smart eyeglasses, etc.), a communication device affixed to a lanyard, a backpack, or the like, a communication device without a speaker and/or a display screen, or a similar type of device. In some implementations, monitoring device 210 may provide a registration request to monitoring server 220. In some implementations, monitoring device 210 may receive an acknowledgement from monitoring server 220. In some implementations, monitoring device 210 may provide a registration request to a device associated with network 240. In this case, the device associated with network 240 may handle all (or some) of the tasks or functions of monitoring server 220.

Monitoring server 220 includes one or more devices capable of receiving, storing, generating, processing, and/or providing information associated with device tracking. For example, monitoring server 220 may include a server device or a group of server devices. In some implementations, monitoring server 220 may receive a request for a network-assigned identifier from user device 230. In some implementations, monitoring server 220 may provide the network-assigned identifier to user device 230. In some implementations, monitoring server 220 may serve as an intermediary to orchestrate establishing a communication session between monitoring device 210 and user device 230.

User device 230 includes one or more devices capable of receiving, generating, storing, processing, and/or providing information associated with device tracking. For example, user device 230 may include a communication and/or computing device, such as a phone (e.g., a mobile phone, a radiotelephone, a smartphone, etc.), a laptop computer, a tablet computer, a handheld computer, a gaming device, a wearable communication device (e.g., a smart wristwatch, a pair of smart eyeglasses, etc.), or a similar type of device. In some implementations, user device 230 may power on WPAN capabilities, and may pair with monitoring device 210. In some implementations, user device 230 may establish a communication session with monitoring device 210 via network 240.

Network 240 includes one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
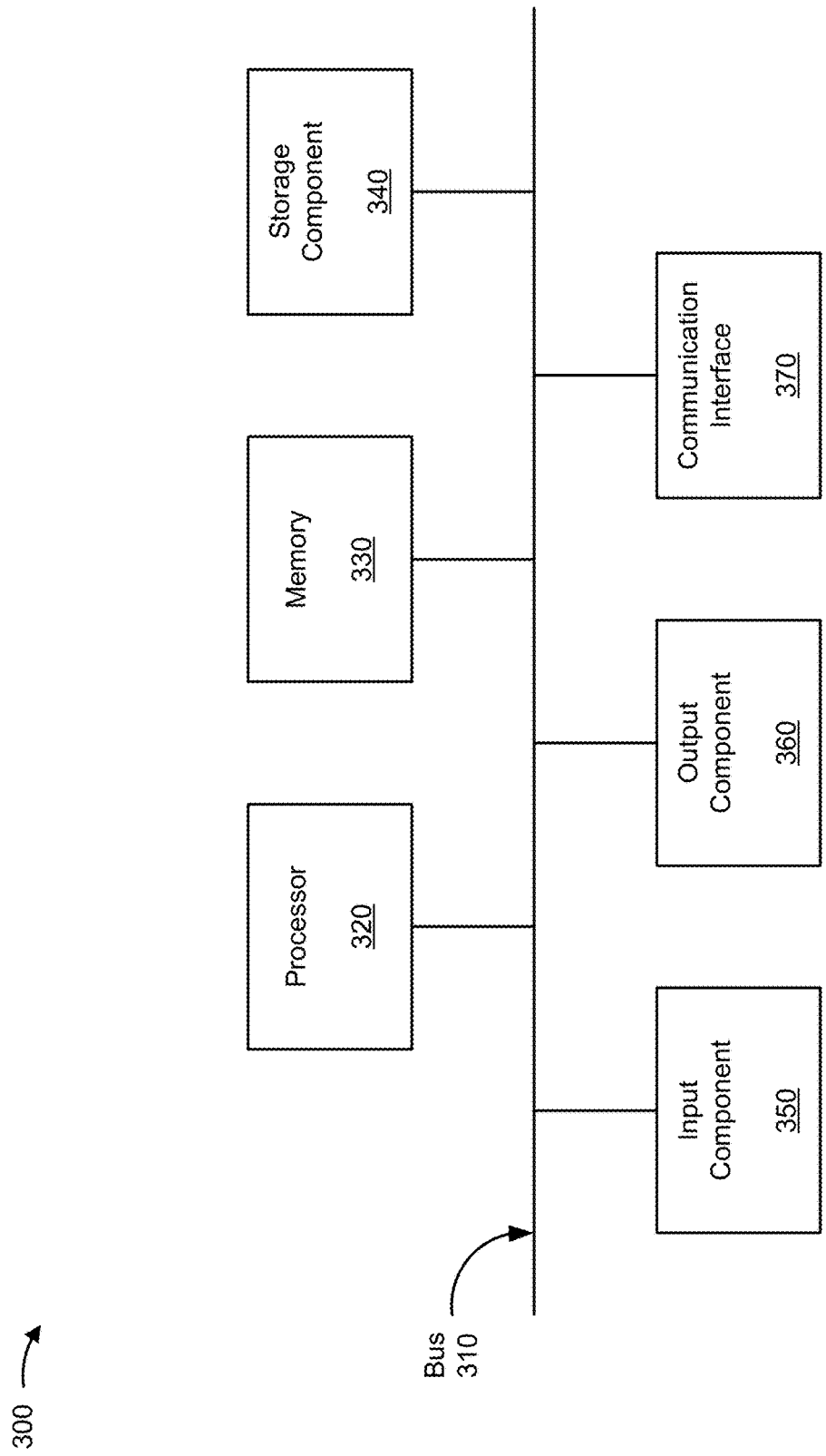
FIG. 3 is a diagram of example components of one or more devices of FIG. 2.

FIG. 3 is a diagram of example components of a device 300. Device 300 may correspond to monitoring device 210, monitoring server 220, and/or user device 230. In some implementations, monitoring device 210, monitoring server 220, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
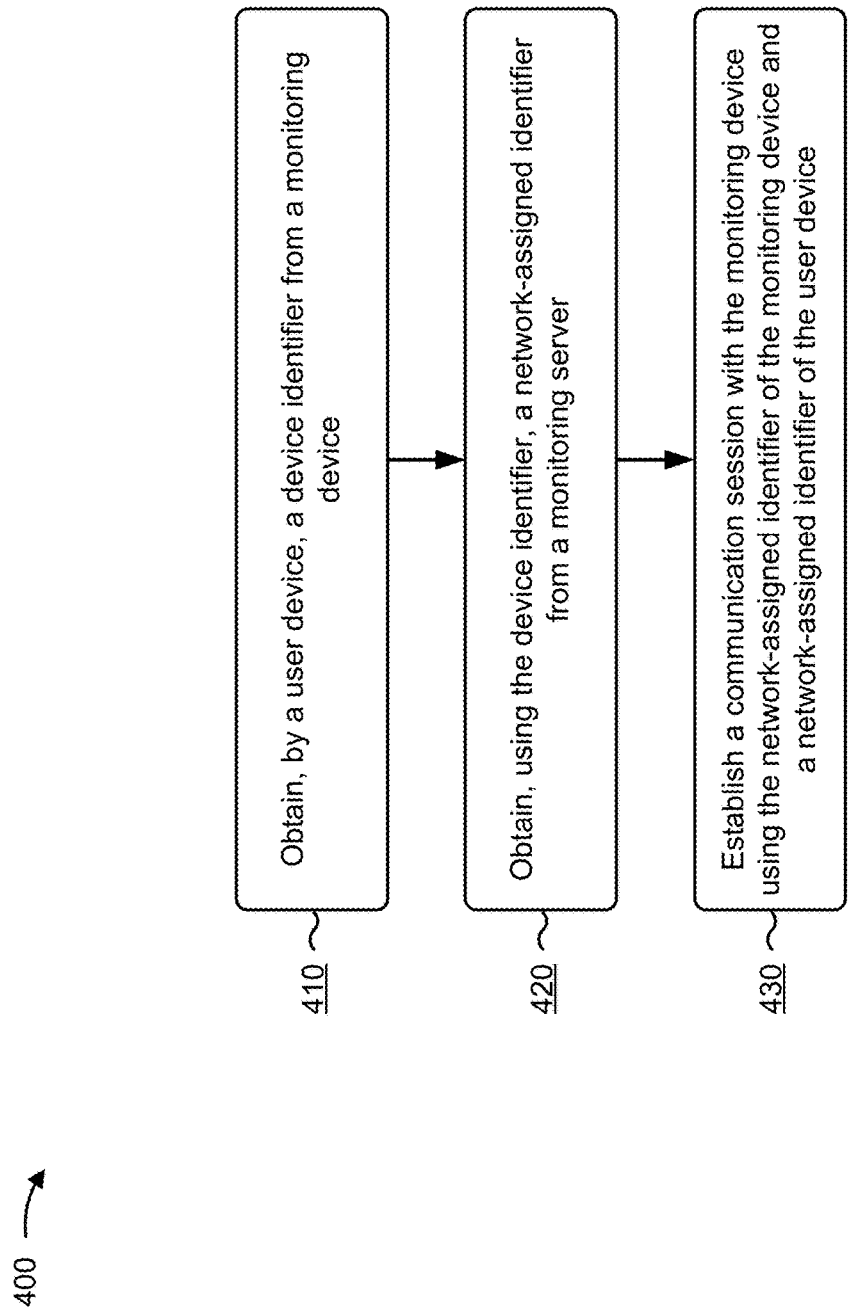
FIG. 4 is a flow chart of an example process for establishing a communication session between a user device and a monitoring device that does not include a display screen or a speaker.

FIG. 4 is a flow chart of an example process 400 for establishing a communication session between a user device and a monitoring device that does not include a display screen or a speaker. In some implementations, one or more process blocks of FIG. 4 may be performed by user device 230. In some implementations, one or more process blocks of FIG. 4 may be performed by another device or a group of devices separate from or including user device 230, such as monitoring device 210 and monitoring server 220.

As shown in FIG. 4, process 400 may include obtaining, by a user device, a device identifier from a monitoring device (block 410). For example, user device 230 may obtain, from monitoring device 210, a device identifier, such as an international mobile equipment identity (IMEI), a universal device identifier (UDID), or the like.

In some implementations, user device 230 may obtain the device identifier from a monitoring device 210 that does not include a display screen and/or a speaker, and that is capable of sending and/or receiving location information. Monitoring device 210 may be a device attached to a user (e.g., a wristwatch, a lanyard, a backpack, etc.), a device affixed to a vehicle (e.g., a truck, a boat, a plane, etc.), or the like.

In some implementations, monitoring device 210 may include a device identifier. For example, monitoring device 210 may be assigned a device identifier prior to device activation and/or consumer purchase of monitoring device 210. As an example, monitoring device 210 may be assigned a device identifier that is embedded in a code (e.g., a barcode). In this case, the code may be engraved on monitoring device 210 or written on an adhesive paper that is attached to monitoring device 210. As another example, the device identifier may be stored in memory, such that the device identifier may be obtained from memory and sent to user device 230 via a wireless personal area network (WPAN). As another example, the device identifier may be engraved in monitoring device 210 or written on an adhesive paper that is attached to monitoring device 210 (e.g., but not embedded in a code).

In some implementations, monitoring device 210 may include a network-assigned identifier. For example, a user may purchase monitoring device 210 (e.g., from a retail store), and monitoring device 210 may be activated to receive a network-assigned identifier. A network-assigned identifier may be a mobile directory number (MDN), a mobile station international subscriber directory number (MSISDN), or the like.

In some implementations, monitoring device 210 may provide a registration request to monitoring server 220. For example, monitoring device 210 may access a uniform resource locator (URL) associated with monitoring server 220 to provide a registration request. The registration request may include a device identifier (e.g., an IMEI) and a network-assigned identifier (e.g., an MDN). In this case, monitoring server 220 may store the device identifier and the network-assigned identifier using a data structure (e.g., an array, a hash table, a linked-list, a tree, etc.), and may provide an acknowledgement to monitoring device 210 to indicate that the device registration is complete. In some cases, monitoring server 220 may query a network server (e.g., a home subscriber server (HSS)) to verify that the device identifier and/or the network-assigned identifier belong to monitoring device 210.

In some implementations, monitoring device 210 may provide a registration request to a device associated with network 240. In this case, the device associated with network 240 may perform all (or some) tasks or functions that would otherwise be performed by monitoring server 220.

In some implementations, user device 230 may obtain a device identifier using a scanning technique. For example, user device 230 may obtain the device identifier by scanning a code (e.g., a barcode) affixed to or embedded on monitoring device 210. In this case, a user may interact with a user interface of user device 230 to launch a tracking application that includes a scanner (or a third party scanner application), and the user may use the application and/or scanner application to scan the code. As an example, assume the device identifier is embedded within a barcode. In this case, user device 230 may scan the barcode, and the output of the scan may be the device identifier.

In some implementations, user device 230 may obtain a device identifier using a communication made via a WPAN. For example, assume that monitoring device 210 and user device 230 both support communications via a WPAN (e.g., a Bluetooth or other short range connection). In this case, monitoring device 210 and user device 230 may power on WPAN communication capabilities. Additionally, user device 230 may identify monitoring device 210 using a scan, and may pair with monitoring device 210 to establish a connection via the WPAN. Additionally, user device 230 may, after pairing with monitoring device 210, obtain the device identifier. In this case, user device 230 may request and receive the device identifier, may receive the device identifier via a broadcast, or the like. In some cases, because monitoring device 210 does not have a display screen, WPAN capabilities may be turned on automatically upon boot-up, or by pressing a button on monitoring device 210.

In some implementations, user device 230 may obtain a device identifier via manual input. For example, assume monitoring device 210 has a device identifier engraving or an adhesive paper that is attached to monitoring device 210 that includes the device identifier. In this case, a user in close physical proximity of monitoring device 210 may read the device identifier, and may interact with user device 230 to input the device identifier to the tracking application.

In this way, user device 230 obtains a device identifier that may be used to obtain a network-assigned identifier that is associated with monitoring device 210.

As further shown in FIG. 4, process 400 may include obtaining, using the device identifier, a network-assigned identifier from a monitoring server (block 420). For example, user device 230 may use the device identifier to obtain a network-assigned identifier that is associated with monitoring device 210.

In some implementations, monitoring server 220 may store device information using a data structure. For example, monitoring server 220 may store device information (e.g., the device identifier, the network-assigned identifier, etc.) using a data structure, such as an array, a database, a graph, a hash table, a linked-list, a tree, and/or the like.

In some implementations, user device 230 may provide a request for a network-assigned identifier to monitoring server 220. In this case, the request may include the device identifier. In some implementations, monitoring server 220 may receive the request, and may use the device identifier to search the data structure for the network-assigned identifier. In this case, monitoring server 220 may provide a response to user device 230 that includes the network-assigned identifier.

In this way, user device 230 is able to obtain a network-assigned identifier that may be used to establish a communication session with monitoring device 210.

As further shown in FIG. 4, process 400 may include establishing a communication session with the monitoring device using the network-assigned identifier of the monitoring device and a network-assigned identifier of the user device (block 430). For example, user device 230 may use the network-assigned identifier to establish a communication session with monitoring device 210 despite that monitoring device 210 does not have a display screen and does not have a speaker.

In some implementations, user device 230 may request to establish a communication session with monitoring device 210. For example, user device 230 may provide a request to establish a communication session to monitoring server 220. The request may include the network-assigned identifier of monitoring device 210 and the network-assigned identifier of user device 230. In this case, the request may be received by monitoring server 220, which may cause monitoring server 220 to provide the request to monitoring device 210 (e.g., using one or more network devices (e.g., base stations, hubs, routers, etc.) as intermediaries.

In some implementations, monitoring device 210 may accept the request to establish the communication session. For example, monitoring device 210 may be configured to automatically establish the communication session upon receiving the request, may include a button that a user may select to accept and establish the communication session, and/or the like.

In some implementations, user device 230 may receive an indication that the communication session is established. For example, after the communication session is established, user device 230 may receive an indication (e.g., a ping, an SMS message, etc.) to alert user device 230 that the communication session is established and that user device 230 may begin to track the location of monitoring device 210.

In some implementations, user device 230 may obtain location information associated with monitoring device 210. For example, user device 230 may, using the communication session, obtain location information indicating a geographic location of monitoring device 210.

In this way, user device 230 is able to establish a communication session with monitoring device 210 despite that monitoring device 210 does not have a display screen and does not have a speaker.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, user device 230 is able to obtain and use the network-assigned identifier to establish a communication session with monitoring device 210, without requiring monitoring device 210 to have a display screen or a speaker. Furthermore, by pairing monitoring device 210 and user device 230 using one or more methods described herein, the one or more methods conserve processing resources of monitoring device 210 that might otherwise be used to display the network-assigned identifier on a display screen or that might otherwise be used to provide the network-assigned identifier via a voice communication and a speaker.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      obtain a device identifier from a monitoring device without the device having previously registered the monitoring device with a server device,
         the device identifier being an international mobile equipment identity (IMEI),
         the device identifier being assigned prior to an activation process, and
         the monitoring device being a portable monitoring device that does not include a display screen and does not include a speaker;
      provide, to the server device, a first request for a network-assigned identifier that is associated with the monitoring device,
         the first request including the IMEI,
         the IMEI being used to obtain the network-assigned identifier, and
         the network-assigned identifier being assigned during the activation process and not pre-allocated or assigned to the monitoring device prior to the activation process;
      receive, after providing the first request and from the server device, the network-assigned identifier of the monitoring device,
         the network-assigned identifier being a mobile directory number (MDN) associated with the monitoring device;
      provide, to the server device, a second request to establish a communication session,
         the second request including the MDN associated with the monitoring device and a MDN associated with the device; and
      receive an indication that the communication session is established.

2. The device of claim 1, where the one or more processors, when obtaining the device identifier, are to:
   scan a code associated with the monitoring device to obtain the device identifier.

3. The device of claim 1, where the one or more processors, when obtaining the device identifier, are to:
pair with the monitoring device to establish a connection via a wireless personal area network (WPAN), and
obtain the device identifier via the connection.

4. The device of claim 1, where the one or more processors, when obtaining the device identifier, are to:
receive the device identifier via a user interface of the device.

5. The device of claim 1, where the one or more processors, when establishing the communication session, are to:
cause the server device to provide the second request to the monitoring device to cause the communication session to be established.

6. The device of claim 1, where the one or more processors are further to:
obtain, after establishing the communication session, location information indicating a geographic location of the monitoring device.

7. A non-transitory computer-readable medium storing instructions, the instructions comprising:
one or more instructions that, when executed by one or more processors of a device, cause the one or more processors to:
obtain a device identifier from a monitoring device without the device having previously registered the monitoring device with a server device,
the device identifier being an international mobile equipment identity (IMEI),
the device identifier being assigned prior to an activation process, and
the monitoring device does not include a display screen and does not include a speaker;
obtain, using the device identifier, a network-assigned identifier from the server device,
the IMEI being used to obtain the network-assigned identifier,
the network-assigned identifier being assigned during the activation process and not pre-allocated or assigned to the monitoring device prior to the activation process,
the network-assigned identifier being associated with the monitoring device, and
the network-assigned identifier associated with the monitoring device being a mobile directory number (MDN);
provide, to the server device, a request to establish a communication session with the monitoring device,
the request including the network-assigned identifier of the monitoring device and a network-assigned identifier of the device; and
receive an indication that the communication session is established.

8. The non-transitory computer-readable medium of claim 7, where the one or more instructions, that cause the one or more processors to obtain the device identifier, cause the one or more processors to:
scan a code associated with the monitoring device to obtain the device identifier.

9. The non-transitory computer-readable medium of claim 7, where the one or more instructions, that cause the one or more processors to obtain the device identifier, cause the one or more processors to:
power on wireless personal area network (WPAN) capabilities,
identify, after powering on WPAN capabilities, the monitoring device using a scan,
pair with the monitoring device after identifying the monitoring device with the scan, and
obtain, from the monitoring device, the device identifier after pairing with the monitoring device.

10. The non-transitory computer-readable medium of claim 7, where the one or more instructions, that cause the one or more processors to obtain the device identifier, cause the one or more processors to:
receive the device identifier via a user interface of the device.

11. The non-transitory computer-readable medium of claim 7, where the one or more instructions, that cause the one or more processors to provide, to the server device, the request to establish the communication session, cause the one or more processors to:
provide the request to establish the communication session,
the server device to provide the request to the monitoring device, and
the monitoring device to automatically establish the communication session upon receiving the request; and
where the one or more instructions, that cause the one or more processors to receive the indication that the communication session is established, cause the one or more processors to:
receive the indication that the communication session is established based on the monitoring device automatically establishing the communication session.

12. The non-transitory computer-readable medium of claim 7, where the one or more instructions, when executed by the one or more processors to, further cause the one or more processors to:
obtain, after receiving the indication that the communication session is established, location information indicating a geographic location of the monitoring device.

13. A method, comprising:
obtaining, by a device, a device identifier from a monitoring device without the device having previously registered the monitoring device with a server device,
the device identifier being an international mobile equipment identity (IMEI), and
the device identifier being assigned prior to an activation process;
providing, by the device and to the server device, a first request for a network-assigned identifier that is associated with the monitoring device,
the first request including the IMEI,
the IMEI being used to obtain the network-assigned identifier,
the network-assigned identifier being assigned during the activation process and not pre-allocated or assigned to the monitoring device prior to the activation process,
the first request to cause the server device to use the device identifier to search a data structure for the network-assigned identifier, and
the network-assigned identifier being a mobile directory number (MDN) associated with the monitoring device;
receiving, by the device and from the server device, the network-assigned identifier;
providing, by the device, a second request to establish a communication session with the monitoring device,
the second request including the network-assigned identifier of the monitoring device and a network-assigned identifier of the device; and receiving, by the device and after providing the second request, an indication that the communication session is established.

14. The method of claim 13, where the monitoring device does not include a display screen or a speaker.

15. The method of claim 13, where obtaining the device identifier comprises:
   obtaining the device identifier from the monitoring device by providing, without communicating with the device, a registration request to the server device to cause the server device to register the monitoring device and providing an acknowledgement to the monitoring device after registration is complete.

16. The method of claim 13, where obtaining the device identifier comprises:
   scanning a code associated with the monitoring device to obtain the device identifier.

17. The method of claim 13, where obtaining the device identifier comprises:
   powering on wireless personal area network (WPAN) capabilities,
   pairing with the monitoring device to establish a communication session via the WPAN, and
   obtaining the device identifier via the communication session.

18. The method of claim 13, where providing the second request to establish the communication session comprises:
   providing the second request to establish the communication session to the server device,
     the server device to provide the second request to the monitoring device, and
     the monitoring device to establish the communication session; and
   where receiving the indication that the communication session is established comprises:
     receiving the indication that the communication session is established based on the monitoring device establishing the communication session.

19. The method of claim 13, further comprising:
   obtaining, after receiving the indication that the communication session has been established, location information indicating a geographic location of the monitoring device.

20. The device of claim 1, where, when receiving the indication that the communication session is established, the one or more processors are further to:
   receive a ping; or
   receive a short message service (SMS) message.

* * * * *